|||||||||||||||||||||||||||||||||||||||||||||||||||||
US009204277B2

(12) United States Patent
Ung, Jr.

(10) Patent No.: US 9,204,277 B2
(45) Date of Patent: *Dec. 1, 2015

(54) EMERGENCY TEXT MESSAGING

(71) Applicant: TeleCommunication Systems, Inc., Annapolis, MD (US)

(72) Inventor: Dara Ung, Jr., Harwood, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,769

(22) Filed: Dec. 10, 2014

(65) Prior Publication Data

US 2015/0094015 A1 Apr. 2, 2015

Related U.S. Application Data

(63) Continuation of application No. 13/659,198, filed on Oct. 24, 2012, now Pat. No. 8,929,854.

(60) Provisional application No. 61/552,181, filed on Oct. 27, 2011.

(51) Int. Cl.
*H04W 4/22* (2009.01)
*H04W 4/14* (2009.01)
(Continued)

(52) U.S. Cl.
CPC *H04W 4/22* (2013.01); *H04W 4/02* (2013.01); *H04W 4/14* (2013.01); *H04W 12/02* (2013.01)

(58) Field of Classification Search
CPC ......... H04W 4/22; H04W 12/02; H04W 4/02; H04W 4/025; H04L 43/065; H04M 3/5116

USPC ............... 455/404.2, 404.1, 466, 403, 550.1; 705/7.15
See application file for complete search history.

(56) References Cited

U.S. PATENT DOCUMENTS

| 1,103,073 A | 7/1914 | O'Connel |
| 4,494,119 A | 1/1985 | Wimbush |

(Continued)

FOREIGN PATENT DOCUMENTS

| AU | WO97/41654 | 11/1997 |
| KR | WO/2006/075856 | 7/2006 |

OTHER PUBLICATIONS

Newsletter "Sonera Bill Warning" Digital Cellular Report. Stevenage: Jun. 17, 1998. vol. 4, Iss.; p. 1.

(Continued)

*Primary Examiner* — Phuoc H Doan
(74) *Attorney, Agent, or Firm* — William H. Bollman

(57) ABSTRACT

A location privacy configuration module enables location determination to emergency services only relating to an emergency text message or emergency text message session. An emergency text message transmitted to an emergency number is routed to an emergency text message server, which initiates an emergency text indicator for each emergency text message, and requests location information for the emergency texting device by transmitting the emergency text indicator and a location request to a location determination server. Location of the emergency texting device may be obtained without acquiring customer authorization for location determination. The originating text messaging device acknowledges receipt of the emergency text indicator/location request combination and checks the location privacy setting configured thereon. Location determination is permitted if configured to permit location determination if emergency text messaging.

22 Claims, 5 Drawing Sheets

(51) Int. Cl.
*H04W 12/02* (2009.01)
*H04W 4/02* (2009.01)

(56) References Cited

U.S. PATENT DOCUMENTS

| | | |
|---|---|---|
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,150,113 A | 9/1992 | Bluthgen |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,235,630 A | 8/1993 | Moody et al. |
| 5,239,570 A | 8/1993 | Koster |
| 5,243,645 A | 9/1993 | Bissell et al. |
| 5,266,944 A | 11/1993 | Carroll et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergren et al. |
| 5,430,759 A | 7/1995 | Yokev |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,694,546 A | 12/1997 | Reisman |
| 5,719,918 A | 2/1998 | Serbetciouglu |
| 5,740,534 A | 4/1998 | Ayerst et al. |
| 5,754,636 A | 5/1998 | Bayless |
| 5,758,088 A | 5/1998 | Bezaire et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,793,859 A | 8/1998 | Matthews |
| 5,794,142 A | 8/1998 | Vanttila et al. |
| 5,797,091 A | 8/1998 | Clise et al. |
| 5,797,094 A | 8/1998 | Houde et al. |
| 5,797,096 A | 8/1998 | Lupien et al. |
| 5,802,492 A | 9/1998 | DeLorme et al. |
| 5,806,000 A | 9/1998 | Vo et al. |
| 5,822,700 A | 10/1998 | Hult et al. |
| 5,825,283 A | 10/1998 | Camhi |
| 5,828,740 A | 10/1998 | Khuc et al. |
| 5,889,473 A | 3/1999 | Wicks |
| 5,903,726 A | 5/1999 | Donovan |
| 5,905,736 A | 5/1999 | Ronen et al. |
| 5,920,820 A | 7/1999 | Qureshi |
| 5,920,821 A | 7/1999 | Seazholtz et al. |
| 5,930,701 A | 7/1999 | Skog |
| 5,940,756 A | 8/1999 | Sibecas |
| 5,941,945 A | 8/1999 | Aditham |
| 5,943,399 A | 8/1999 | Bannister et al. |
| 5,946,629 A | 8/1999 | Sawyer et al. |
| 5,946,630 A | 8/1999 | Willars et al. |
| 5,949,326 A | 9/1999 | Wicks et al. |
| 5,950,130 A | 9/1999 | Coursey |
| 5,953,398 A | 9/1999 | Hill |
| 5,959,543 A | 9/1999 | LaPorta |
| 5,960,074 A | 9/1999 | Clark |
| 5,963,864 A | 10/1999 | O'Neil |
| 5,966,663 A | 10/1999 | Gleason |
| 5,974,054 A | 10/1999 | Couts et al. |
| 5,974,133 A | 10/1999 | Fleischer |
| 5,978,685 A | 11/1999 | Laiho |
| 5,987,323 A | 11/1999 | Huotari |
| 5,999,811 A | 12/1999 | Molne |
| 6,021,333 A | 2/2000 | Anderson |
| 6,023,470 A | 2/2000 | Lee |
| 6,035,025 A | 3/2000 | Hanson |
| 6,038,444 A | 3/2000 | Schipper |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,073,004 A | 6/2000 | Balachandran |
| 6,073,015 A | 6/2000 | Berggren et al. |
| 6,075,982 A | 6/2000 | Donovan et al. |
| 6,078,583 A | 6/2000 | Takahara |
| 6,081,508 A | 6/2000 | West et al. |
| 6,094,574 A | 7/2000 | Vance |
| 6,101,378 A | 8/2000 | Barabash et al. |
| 6,119,014 A | 9/2000 | Alperovich et al. |
| 6,122,503 A | 9/2000 | Daly |
| 6,122,520 A | 9/2000 | Want et al. |
| 6,134,432 A | 10/2000 | Holmes |

(56) References Cited

U.S. PATENT DOCUMENTS

| | | |
|---|---|---|
| 6,138,158 A | 10/2000 | Boyle et al. |
| 6,144,653 A | 11/2000 | Persson |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,175,922 B1 | 1/2001 | Wang |
| 6,178,331 B1 | 1/2001 | Holmes et al. |
| 6,181,935 B1 | 1/2001 | Gossman et al. |
| 6,185,602 B1 | 2/2001 | Bayrakeri |
| 6,188,752 B1 | 2/2001 | Lesley |
| 6,189,031 B1 | 2/2001 | Badger et al. |
| 6,195,543 B1 | 2/2001 | Granberg |
| 6,195,651 B1 | 2/2001 | Handel |
| 6,198,431 B1 | 3/2001 | Gibson |
| 6,199,045 B1 | 3/2001 | Giniger et al. |
| 6,205,330 B1 | 3/2001 | Winbladh |
| 6,208,854 B1 | 3/2001 | Roberts et al. |
| 6,208,870 B1 | 3/2001 | Lorello |
| 6,216,008 B1 | 4/2001 | Lee |
| 6,219,669 B1 | 4/2001 | Haff |
| 6,223,042 B1 | 4/2001 | Raffel |
| 6,223,046 B1 | 4/2001 | Hamill-Keays et al. |
| 6,226,529 B1 | 5/2001 | Bruno et al. |
| 6,244,758 B1 | 6/2001 | Solymar |
| 6,246,879 B1 | 6/2001 | Segura et al. |
| 6,249,680 B1 | 6/2001 | Wax et al. |
| 6,249,744 B1 | 6/2001 | Morita |
| 6,263,212 B1 | 7/2001 | Ross et al. |
| 6,263,372 B1 | 7/2001 | Hogan et al. |
| 6,266,614 B1 | 7/2001 | Alumbaugh |
| 6,289,095 B1 | 9/2001 | Buttitta |
| 6,289,373 B1 | 9/2001 | Dezonno |
| 6,301,695 B1 | 10/2001 | Burnham |
| 6,304,898 B1 | 10/2001 | Shiigi |
| 6,311,055 B1 | 10/2001 | Boltz |
| 6,314,108 B1 | 11/2001 | Ramasubramani et al. |
| 6,317,594 B1 | 11/2001 | Gossman et al. |
| 6,321,257 B1 | 11/2001 | Kotola et al. |
| 6,327,479 B1 | 12/2001 | Mikkola |
| 6,330,600 B1 | 12/2001 | Matchefts et al. |
| 6,353,614 B1 | 3/2002 | Borella et al. |
| 6,353,621 B1 | 3/2002 | Boland |
| 6,366,663 B1 | 4/2002 | Bauer et al. |
| 6,366,961 B1 | 4/2002 | Subbiah |
| 6,370,242 B1 | 4/2002 | Speers |
| 6,370,373 B1 | 4/2002 | Gerth |
| 6,373,930 B1 | 4/2002 | McConnell |
| 6,381,535 B1 | 4/2002 | Durocher |
| 6,389,421 B1 | 5/2002 | Hawkins et al. |
| 6,389,455 B1 | 5/2002 | Fuisz |
| 6,393,014 B1 | 5/2002 | Daly |
| 6,393,461 B1 | 5/2002 | Okada |
| 6,396,913 B1 | 5/2002 | Perkins, III |
| 6,397,054 B1 | 5/2002 | Hoirup |
| 6,397,064 B1 | 5/2002 | Bridges |
| 6,408,177 B1 | 6/2002 | Parikh et al. |
| 6,421,707 B1 | 7/2002 | Miller |
| 6,421,733 B1 | 7/2002 | Tso |
| 6,424,841 B1 | 7/2002 | Gustafsson |
| 6,442,589 B1 | 8/2002 | Takahashi et al. |
| 6,446,112 B1 | 9/2002 | Bunney |
| 6,456,852 B2 | 9/2002 | Bar et al. |
| 6,459,892 B2 | 10/2002 | Burgan |
| 6,463,145 B1 | 10/2002 | O'Neal et al. |
| 6,470,181 B1 | 10/2002 | Maxwell |
| 6,473,622 B1 | 10/2002 | Meuronen |
| 6,480,710 B1 | 11/2002 | Laybourn |
| 6,487,180 B1 | 11/2002 | Borgstahl |
| 6,487,602 B1 | 11/2002 | Thakker |
| 6,490,450 B1 | 12/2002 | Batni et al. |
| 6,493,430 B2 | 12/2002 | Leuca |
| 6,493,558 B1 | 12/2002 | Bernhart |
| 6,499,053 B1 | 12/2002 | Marquette et al. |
| 6,502,086 B2 | 12/2002 | Pratt |
| 6,505,046 B1 | 1/2003 | Baker |
| 6,507,589 B1 | 1/2003 | Ramasubramani et al. |
| 6,512,930 B2 | 1/2003 | Sandegren |
| 6,526,335 B1 | 2/2003 | Treyz |
| 6,526,351 B2 | 2/2003 | Whitham |
| 6,529,732 B1 | 3/2003 | Vainiomaki et al. |
| 6,538,561 B2 | 3/2003 | Angus |
| 6,560,456 B1 | 5/2003 | Lohtia et al. |
| 6,564,261 B1 | 5/2003 | Gudjonsson et al. |
| 6,567,979 B1 | 5/2003 | deCarmo |
| 6,587,688 B1 | 7/2003 | Chambers et al. |
| 6,587,691 B1 | 7/2003 | Granstam et al. |
| 6,591,304 B1 | 7/2003 | Sitaraman et al. |
| 6,609,004 B1 | 8/2003 | Morse |
| 6,618,763 B1 | 9/2003 | Steinberg |
| 6,621,810 B1 | 9/2003 | Leung |
| 6,625,461 B1 | 9/2003 | Bertacchi |
| 6,654,786 B1 | 11/2003 | Fox et al. |
| 6,658,260 B2 | 12/2003 | Knotts |
| 6,662,015 B2 | 12/2003 | Furlong |
| 6,667,688 B1 | 12/2003 | Menard et al. |
| 6,671,356 B2 | 12/2003 | Lewis |
| 6,674,767 B1 | 1/2004 | Kadyk |
| 6,677,894 B2 | 1/2004 | Sheynblat |
| 6,681,257 B1 | 1/2004 | Patel |
| 6,711,411 B1 | 3/2004 | Ruffini |
| 6,718,178 B1 | 4/2004 | Sladek et al. |
| 6,725,268 B1 | 4/2004 | Jackel |
| 6,728,353 B1 | 4/2004 | Espejo et al. |
| 6,728,635 B2 | 4/2004 | Hamada |
| 6,731,943 B1 | 5/2004 | McCormick |
| 6,757,708 B1 | 6/2004 | Craig et al. |
| 6,771,971 B2 | 8/2004 | Smith |
| 6,779,022 B1 | 8/2004 | Hortsmann et al. |
| 6,785,659 B1 | 8/2004 | Landsman |
| 6,850,916 B1 | 1/2005 | Wang |
| 6,868,074 B1 | 3/2005 | Hanson |
| 6,879,835 B2 | 4/2005 | Greene |
| 6,886,017 B1 | 4/2005 | Jackson |
| 6,915,138 B2 | 7/2005 | Kraft |
| 6,961,330 B1 | 11/2005 | Cattan et al. |
| 6,970,869 B1 | 11/2005 | Slaughter et al. |
| 6,985,742 B1 | 1/2006 | Giniger |
| 6,987,969 B1 | 1/2006 | Bruing |
| 6,993,325 B1 | 1/2006 | Waesterlid |
| 7,010,303 B2 | 3/2006 | Lewis |
| 7,020,480 B2 | 3/2006 | Coskun |
| 7,058,036 B1 | 6/2006 | Yu |
| 7,069,439 B1 | 6/2006 | Chen |
| 7,072,665 B1 | 7/2006 | Blumberg |
| 7,088,990 B1 | 8/2006 | Isomursu |
| 7,116,972 B1 | 10/2006 | Zhang et al. |
| 7,120,418 B2 | 10/2006 | Herajarvi |
| 7,127,264 B2 | 10/2006 | Hronek |
| 7,130,383 B2 | 10/2006 | Naidoo |
| 7,145,462 B2 | 12/2006 | Dewing |
| 7,180,415 B2 | 2/2007 | Bankert |
| 7,240,108 B2 | 7/2007 | Smith |
| 7,245,216 B2 | 7/2007 | Burkley |
| 7,317,705 B2 | 1/2008 | Hanson |
| 7,318,098 B2 | 1/2008 | Steinberg |
| 7,328,031 B2 | 2/2008 | Kraft |
| RE40,243 E | 4/2008 | Leuca |
| 7,356,328 B1 | 4/2008 | Espejo |
| 7,366,529 B2 | 4/2008 | Alanara |
| 7,386,588 B2 | 6/2008 | Mousseau |
| 7,392,038 B1 | 6/2008 | Ratschunas |
| 7,437,348 B1 | 10/2008 | Wyett |
| 7,509,136 B2 | 3/2009 | Hart |
| 7,519,654 B1 | 4/2009 | Smith |
| RE40,780 E | 6/2009 | Leuca |
| 7,590,225 B2 | 9/2009 | Sivula |
| 7,627,305 B2 | 12/2009 | Helferich |
| 7,761,511 B2 | 7/2010 | Kaplan |
| 7,809,382 B2 | 10/2010 | Smith |
| 7,826,818 B2 | 11/2010 | Gollnick |
| 7,860,068 B2 | 12/2010 | Smith |
| 7,864,927 B2 | 1/2011 | Loizeaux |

(56) References Cited

U.S. PATENT DOCUMENTS

| | | |
|---|---|---|
| 7,890,127 B2 | 2/2011 | Knotts |
| 7,991,411 B2 | 8/2011 | Johnson |
| 8,185,087 B2 | 5/2012 | Mitchell, Jr. |
| 8,300,529 B2 | 10/2012 | Strub |
| 2001/0006889 A1 | 7/2001 | Kraft |
| 2001/0031641 A1 | 10/2001 | Ung |
| 2001/0032267 A1 | 10/2001 | Collison |
| 2001/0034224 A1 | 10/2001 | McDowell et al. |
| 2001/0041579 A1 | 11/2001 | Smith et al. |
| 2002/0052968 A1 | 5/2002 | Bonefas et al. |
| 2002/0069079 A1 | 6/2002 | Vega |
| 2002/0091789 A1 | 7/2002 | Katariya et al. |
| 2002/0093435 A1 | 7/2002 | Baron |
| 2002/0098851 A1 | 7/2002 | Walczak |
| 2002/0116263 A1 | 8/2002 | Gouge |
| 2002/0118800 A1 | 8/2002 | Martinez |
| 2002/0119793 A1 | 8/2002 | Hronek et al. |
| 2002/0133568 A1 | 9/2002 | Smith |
| 2002/0168986 A1 | 11/2002 | Lau et al. |
| 2002/0181681 A1 | 12/2002 | Mani |
| 2002/0183072 A1 | 12/2002 | Steinbach |
| 2003/0003909 A1 | 1/2003 | Keronen |
| 2003/0008661 A1 | 1/2003 | Joyce |
| 2003/0017832 A1 | 1/2003 | Anderson |
| 2003/0022664 A1 | 1/2003 | Goldstein |
| 2003/0055912 A1 | 3/2003 | Martin et al. |
| 2003/0058096 A1 | 3/2003 | Shteyn |
| 2003/0060212 A1 | 3/2003 | Thomas |
| 2003/0086422 A1 | 5/2003 | Klinker |
| 2003/0092454 A1 | 5/2003 | Halim |
| 2003/0119525 A1 | 6/2003 | Rajkotia |
| 2003/0120826 A1 | 6/2003 | Shay |
| 2003/0148757 A1 | 8/2003 | Meer |
| 2003/0155413 A1 | 8/2003 | Kovesdi |
| 2003/0186709 A1 | 10/2003 | Rhodes |
| 2003/0186710 A1 | 10/2003 | Muhonen |
| 2003/0187803 A1 | 10/2003 | Pitt |
| 2003/0210656 A1 | 11/2003 | Biacs |
| 2004/0103431 A1 | 5/2004 | Davenport et al. |
| 2004/0110524 A1 | 6/2004 | Takano et al. |
| 2004/0137921 A1 | 7/2004 | Valloppillil |
| 2004/0176104 A1 | 9/2004 | Arcens |
| 2004/0199614 A1 | 10/2004 | Shenfield et al. |
| 2004/0203900 A1 | 10/2004 | Cedervall |
| 2004/0259531 A1 | 12/2004 | Wood et al. |
| 2005/0003803 A1 | 1/2005 | Buckley |
| 2005/0004968 A1 | 1/2005 | Mononen |
| 2005/0020287 A1 | 1/2005 | Pohutsky |
| 2005/0048948 A1 | 3/2005 | Holland |
| 2005/0064884 A1 | 3/2005 | Dumont |
| 2005/0071251 A1 | 3/2005 | Linden |
| 2005/0101338 A1 | 5/2005 | Kraft |
| 2005/0132060 A1 | 6/2005 | Mo |
| 2005/0135569 A1 | 6/2005 | Dickinson |
| 2005/0141522 A1 | 6/2005 | Kadar |
| 2005/0176445 A1 | 8/2005 | Qu |
| 2005/0216300 A1 | 9/2005 | Appelman |
| 2005/0239480 A1 | 10/2005 | Kim |
| 2005/0250516 A1 | 11/2005 | Shim |
| 2005/0261012 A1 | 11/2005 | Weiser |
| 2005/0277432 A1 | 12/2005 | Viana |
| 2005/0282518 A1 | 12/2005 | D'Evelyn |
| 2006/0020965 A1 | 1/2006 | Steelberg |
| 2006/0028995 A1 | 2/2006 | Canoy |
| 2006/0030337 A1 | 2/2006 | Nowak |
| 2006/0036680 A1 | 2/2006 | Shim |
| 2006/0058042 A1 | 3/2006 | Shim |
| 2006/0063536 A1 | 3/2006 | Kim |
| 2006/0079249 A1 | 4/2006 | Shim |
| 2006/0106774 A1 | 5/2006 | Cohen |
| 2006/0109960 A1 | 5/2006 | D'Evelyn |
| 2006/0116138 A1 | 6/2006 | Simsek |
| 2006/0148415 A1 | 7/2006 | Hamalainen et al. |
| 2006/0183460 A1 | 8/2006 | Srinivasan |
| 2006/0194595 A1 | 8/2006 | Myllynen |
| 2006/0223549 A1 | 10/2006 | Chang |
| 2006/0225090 A1 | 10/2006 | Shim |
| 2006/0274696 A1 | 12/2006 | Krishnamurthi |
| 2006/0276168 A1 | 12/2006 | Fuller |
| 2007/0037585 A1 | 2/2007 | Shim |
| 2007/0037586 A1 | 2/2007 | Kim |
| 2007/0072624 A1 | 3/2007 | Niemaenmaa |
| 2007/0082681 A1 | 4/2007 | Kim |
| 2007/0082682 A1 | 4/2007 | Kim |
| 2007/0110076 A1 | 5/2007 | Brouwer |
| 2007/0117574 A1 | 5/2007 | Watanabe |
| 2007/0117577 A1 | 5/2007 | Harris |
| 2007/0136132 A1 | 6/2007 | Weiser |
| 2007/0167177 A1 | 7/2007 | Kraufvelin |
| 2007/0182547 A1 | 8/2007 | Wachter |
| 2007/0243885 A1 | 10/2007 | Shim |
| 2008/0081646 A1 | 4/2008 | Morin |
| 2008/0109650 A1 | 5/2008 | Shim |
| 2008/0208671 A1 | 8/2008 | Ehrlich |
| 2008/0313000 A1 | 12/2008 | Degeratu |
| 2009/0020447 A1 | 1/2009 | Potterfield |
| 2009/0198733 A1 | 8/2009 | Gounares |
| 2009/0204600 A1 | 8/2009 | Kalik |
| 2009/0221263 A1 | 9/2009 | Titus |
| 2010/0003954 A1 | 1/2010 | Greene |
| 2010/0003959 A1 | 1/2010 | Coppage |
| 2010/0010860 A1 | 1/2010 | Bose |
| 2010/0076767 A1 | 3/2010 | Vieri |
| 2010/0120412 A1 | 5/2010 | Tang |
| 2010/0257241 A1 | 10/2010 | Hale |
| 2011/0009086 A1 | 1/2011 | Poremba |
| 2011/0064205 A1 | 3/2011 | Boni |

OTHER PUBLICATIONS

Java-Centric Distributed Computing by Wollrath, A et al..; IEEE, vol. 17 Issue 3, May-Jun. 1997, pp. 44-53.
47 Code of Federal Regulations (Oct. 1, 2005 edition).
PCT International Search Report (PCTUS2007/23714) and Written Opinion of International Searching Authority, Apr. 18, 2008.
PCT International Search Report received in PCT/US2007/21133 dated Apr. 21, 2008.
PCT International Search Report (PCTUS2007/16138) and Written Opinion of International Searching Authority, Feb. 7, 2008.
International Search Report received in PCT/US2012/062204 dated Jan. 9, 2013.
International Search Report received in PCT/US2012/66204 dated Oct. 25, 2014.
U.S. Appl. No. 61/314,432, filed 10/2000, Holmes.

EMERGENCY TEXT MESSAGING

This application is a continuation of U.S. application Ser. No. 13/659,198, filed Oct. 24, 2012, entitled "Emergency Text Messaging"; which claims priority from U.S. Application No. 61/552,181, filed Oct. 27, 2011, entitled "Emergency Test Messaging", the entirety of both of which are expressly incorporated herein by reference.

BACKGROUND OF THE INVENTION

1. Field of the Invention

This invention relates to wireless communications. More particularly, it relates to emergency wireless communications, and to emergency text messaging.

2. Background of the Related Art

As location based services become increasingly prevalent and useful, location services also begin to raise concern for user privacy.

A conventional wireless device includes a location privacy setting to either allow or disallow requesting applications to obtain location information from that particular wireless device. The conventional setting is either ALLOW (Location ON) or DISALLOW (Location OFF) all requests for applications to obtain location information.

FIG. 5 demonstrates an illustrative example of the location privacy setting available on a conventional wireless device.

As depicted in FIG. 5, conventional wireless devices typically comprise an "E9-1-1 Only" location privacy setting 400 (permitting the disclosure of location only to E9-1-1 emergency services requesters); or a "Location On" location privacy setting 410 (permitting the disclosure of location to all requesting applications).

A "Location On" type location privacy setting 410 is a conventional opt-in location privacy technique that provides customer authorization for location disclosure to all requesting types. With "Location On" enabled, a relevant Location based application(s) that is/are active on a wireless device are continuously permitted to obtain location information for that particular device, either on board or from a location determining service via the wireless network.

Alternatively, location based applications that are active on or with a wireless device that are not enabled for a "Location On" type location privacy setting 410, are not permitted to obtain location information for that particular device to applications (or to requesting third parties.) Hence, the "Location On" type location privacy setting 410 in an "off" position does not permit location of a wireless device to be disseminated to any requesting application or third party.

By FCC regulation mandate in the United States, the location of an E9-1-1 calling device may be obtained at all times by emergency services, regardless of the relevant wireless device's location privacy setting. Thus, location information may be obtained without acquiring user consent if location information is authorized to be obtained and/or required by applicable law, e.g., location information that is obtained to assist emergency situations, E9-1-1 voice calls, etc.

A conventional "E9-1-1 emergency services Only" type location privacy setting 400 permits location information for that wireless device to be disseminated only to emergency services in response to an E9-1-1 location request. Hence, if the "E9-1-1 emergency services Only" type location privacy setting 400 is enabled, all non-emergency location requests are denied.

A Mobile Positioning Center (MPC) in a traditional E9-1-1 system transmits a location request to a Position Determining Entity (PDE) to locate the position of an E9-1-1 calling device (e.g., a wireless device that has placed an E9-1-1 call). The Position Determining Entity (PDE) retrieves a geographic location of an E9-1-1 calling device via a known location determination technique, e.g., a Global Positioning System, triangulation, etc. Once retrieved, the Position Determining Entity (PDE) provides location coordinates for the E9-1-1 calling device to the Mobile Positioning Center (MPC). The Mobile Positioning Center (MPC) inserts a geographic location for the relevant E9-1-1 calling device into an E9-1-1 database, for later retrieval by an appropriate Public Safety Answering Point (PSAP) (i.e. a dispatch office that receives 9-1-1 calls from the public).

However, with conventional systems, location is permitted only for emergency voice calls. Text messages, including a text message to an emergency services recipient, will not trigger permission to obtain location for the emergency-texting wireless device.

A detailed description of an exemplary text messaging emergency 911 system may be found in commonly-owned U.S. Pat. No. 8,185,087, entitled "Emergency 911 Data Messaging", to Mitchell, Jr., the entirety of which is hereby expressly incorporated by reference.

SUMMARY OF THE INVENTION

In accordance with the principles of the present invention, a location privacy module enabling location determination for emergency text messages comprises a location privacy wireless device module including a configurable setting module on a wireless device to permit current location determination of the wireless device to be determined in relation to an emergency text message addressed to an emergency destination. A location privacy network server module, associated with an emergency text message server, indicates to a location determination server that a particular location request is associated with an emergency text message and thus location is to be provided.

A method of providing location privacy to an emergency text messaging wireless device in accordance with another aspect of the invention comprises transmitting an emergency text indicator from a network-based emergency text message server to a location determination server. The emergency text indicator is conveyed to an emergency texting device. Location determination of the emergency texting device is performed without sending a consent request to the emergency texting device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
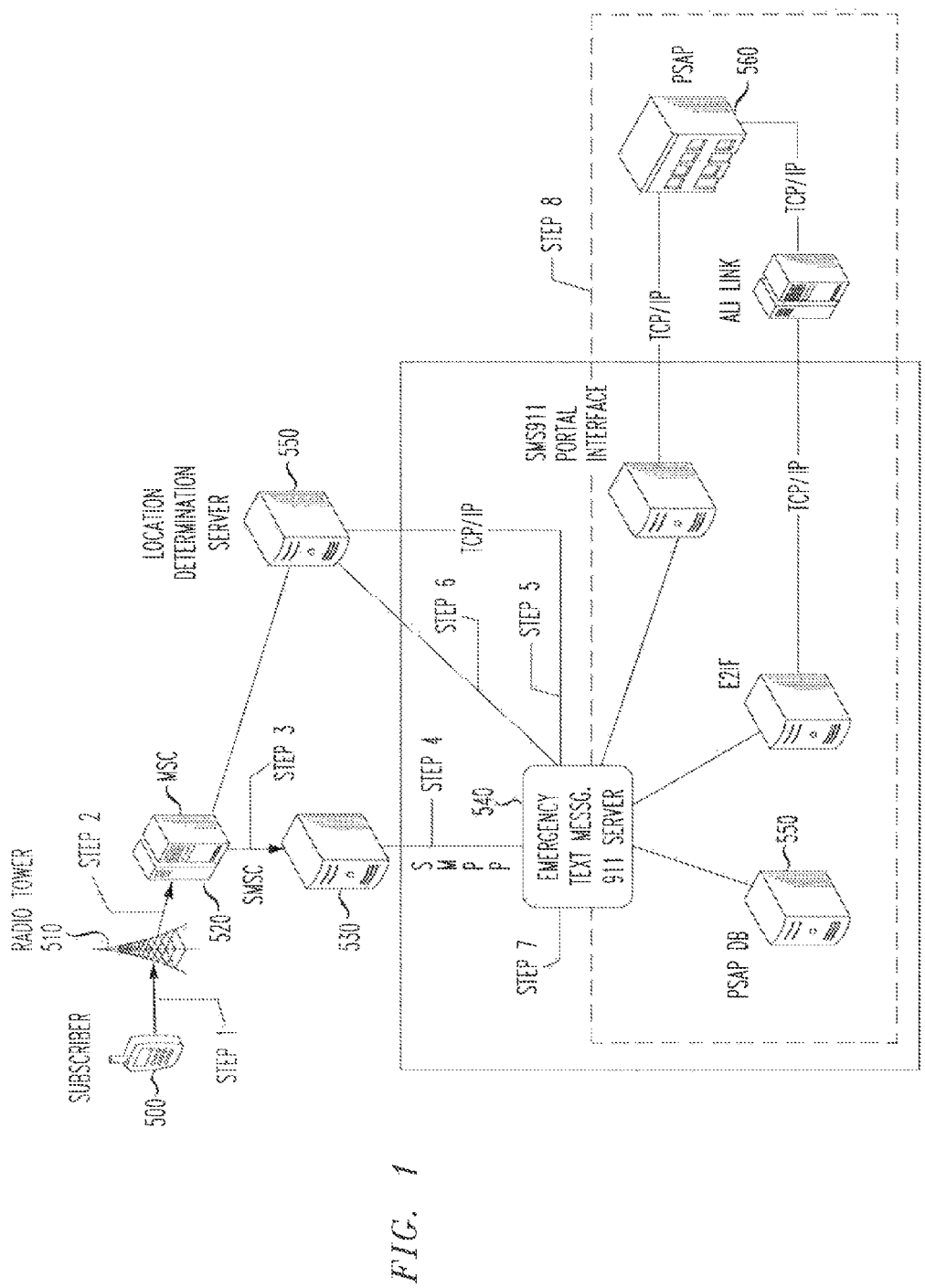
FIG. 1 shows a high level 911 network diagram as it relates to a non-voice emergency communication (e.g., an emergency text message), in accordance with the principles of the present invention.

The present inventors have appreciated that there is a need for a location privacy capability in a wireless device that permits a location of a wireless device to be disseminated to a Public Safety Answering Point (PSAP) during text messaging to 911 emergency text services, without the need to then permit disclosure of location to other requesting, but non-emergency, applications, services, or third parties that may otherwise desire location information.

The present invention comprises a wireless device including a module that provides a user interface to set an emergency text messaging 911 location privacy setting that permits location information for a wireless device in non-voice emergency communication (e.g., emergency text messaging to 911) to be disseminated only to 911 or E9-1-1 emergency services. The inventive permissive location privacy setting for emergency text messaging (e.g. a setting such as "permit location for emergency voice and emergency text messaging only") permits the current location of a wireless device to be provided only when an emergency voice call, emergency text message, or other emergency-related communication is initiated relating to that particular wireless device.

The determination that a given request for location is related to an emergency communication may be presumed when requested by an authorized PSAP or other government-sanctioned emergency services requester. A request from an authorized emergency services source, together with permission granted by the relevant wireless device that location may be provided when not in an active voice call to an emergency services destination (e.g., when in an active call to "911"), is preferably permitted. Alternatively, location may be restricted to a request from a source which has previously been texted with an emergency text message (e.g., a text message to "911" or similar was recently logged.)

The inventive emergency 911 location privacy setting for non-voice communications enables location of a wireless device to be obtained by a requesting 911 emergency service when the wireless device makes a non-voice emergency call, e.g., an emergency text message to 911—without requiring that the relevant wireless device permit location to be provided to all requesting third parties as would be required in a conventional wireless device.

The inventive wireless device including a non-voice emergency 911 location privacy setting as disclosed is enabled by suitable application modules on both the physical wireless device as well as on a physical location-based services server within a wireless network tasked with determining if location of a given wireless device is authorized.

Thus, the inventive emergency non-voice communication setting for location dissemination enables denial of all requests for location information relating to that wireless device that are not requested in relation to a non-voice emergency communication, e.g., an emergency text message, MMS, video clip or feed, etc., addressed to 9-1-1 or other emergency destination.

A network-based software module enables an emergency text 911 server to identify a location request as being related to an established emergency session including non-voice communication. The emergency text message 911 server preferably transmits an emergency text indicator with a given location request so that the location request is flagged as relating to an emergency communication made to emergency 911 services. Moreover, instead of using an emergency text indicator in the existing message (e.g., SLIR or ELIR), another option in accordance with the principles of the present invention is to use a different message altogether.

FIG. 1 shows a high level 911 network diagram as it relates to a non-voice emergency communication (e.g., an emergency text message), in accordance with the principles of the present invention.

In particular, as shown in step 1 of FIG. 1, a wireless device 500 transmits an emergency text message to an emergency number (e.g. 911).

In step 2, the transmitted emergency text message traverses the base station 510, and is delivered to a Mobile Switching Center (MSC) 520.

In step 3, the Mobile Switching Center (MSC) 520 transmits the emergency text message received thereon to a Short Message Service Center (SMSC) 530.

In step 4, upon receipt, the Short Message Service Center (SMSC) 530 routes the emergency text message (e.g., an SMS message in the disclosed embodiment) to an emergency text message 911 server 540.

In step 5, the emergency text message 911 server 540 requests the precise latitude/longitude (lat/lon) and/or rough position (tower/sector) of the emergency texting wireless device 500 from a location determination server 550. The request for location information preferably includes an indicator of "Emergency Services" or similar designation depicting authority to obtain location for the emergency texting wireless device 500.

In step 6, the location determination server 550 calculates the position of the emergency texting wireless device 500, and returns retrieved location information to the emergency text message 911 server 540.

In step 7, the emergency text message 911 server 540 uses the location of the emergency texting wireless device 500 to determine routing for the emergency text message.

In step 8, the emergency text message 911 server 540 routes the emergency text message and location information retrieved for the emergency texting wireless device 500, to an appropriate Public Safety Answering Point (PSAP) 560 via conventional routing procedures.

Thus, when a wireless device transmits an emergency text message (e.g., an SMS text message, an IP based text message, etc.) to an emergency text number (e.g. 911), that emergency text message is routed to an emergency text message 911 server 540. In accordance with the principles of the present invention, when an emergency text message 911 server 540 receives an emergency text message (e.g., an SMS message addressed to an emergency text number), the emergency text message 911 server 540 generates an emergency text indicator.

The emergency text message 911 server 540 transmits an emergency text indicator and a location request (e.g., an emergency text message location request) to a location determination server 550 to request location information for a corresponding emergency texting wireless device 500 (e.g., a wireless device that has transmitted the emergency text message). An emergency text indicator/location request combination indicates to the location determination server 550 that location information should be retrieved absent customer authorization (i.e., the location server shall inhibit the sending of consent request to the user to obtain consent). (Note that in conventional systems, at this point, the location server attempts to send a consent request message to the handset requesting consent from the user. With the inventive use of an emergency text indicator, the server must bypass this procedure.)

In accordance with the principles of the present invention, a location determination server 550 transmits each emergency text indicator received thereon, to a corresponding requesting device during attempted location determination. An emergency text indicator indicates to the location determination server 550 that location information is being requested to aid emergency text messaging 911 services.

In accordance with the principles of the present invention, a wireless device (e.g., Smartphone) with suitable emergency location application recognizes the receipt of a request for location directly from the emergency texting wireless device 500. The request for location includes an emergency text indicator. Acknowledgement of the emergency text indicator/location request combination prompts a wireless handset emergency location application on the wireless device 500 to check its own setting of location privacy. If, e.g., an "E9-1-1 Only" or "E9-1-1 and SMS 911 Only" is set as the wireless devices location privacy setting, or a "Location On" location privacy setting 410 is configured on the emergency texting wireless device 500, location determination is permitted to proceed. Otherwise, location determination is restricted.

Figure 2:
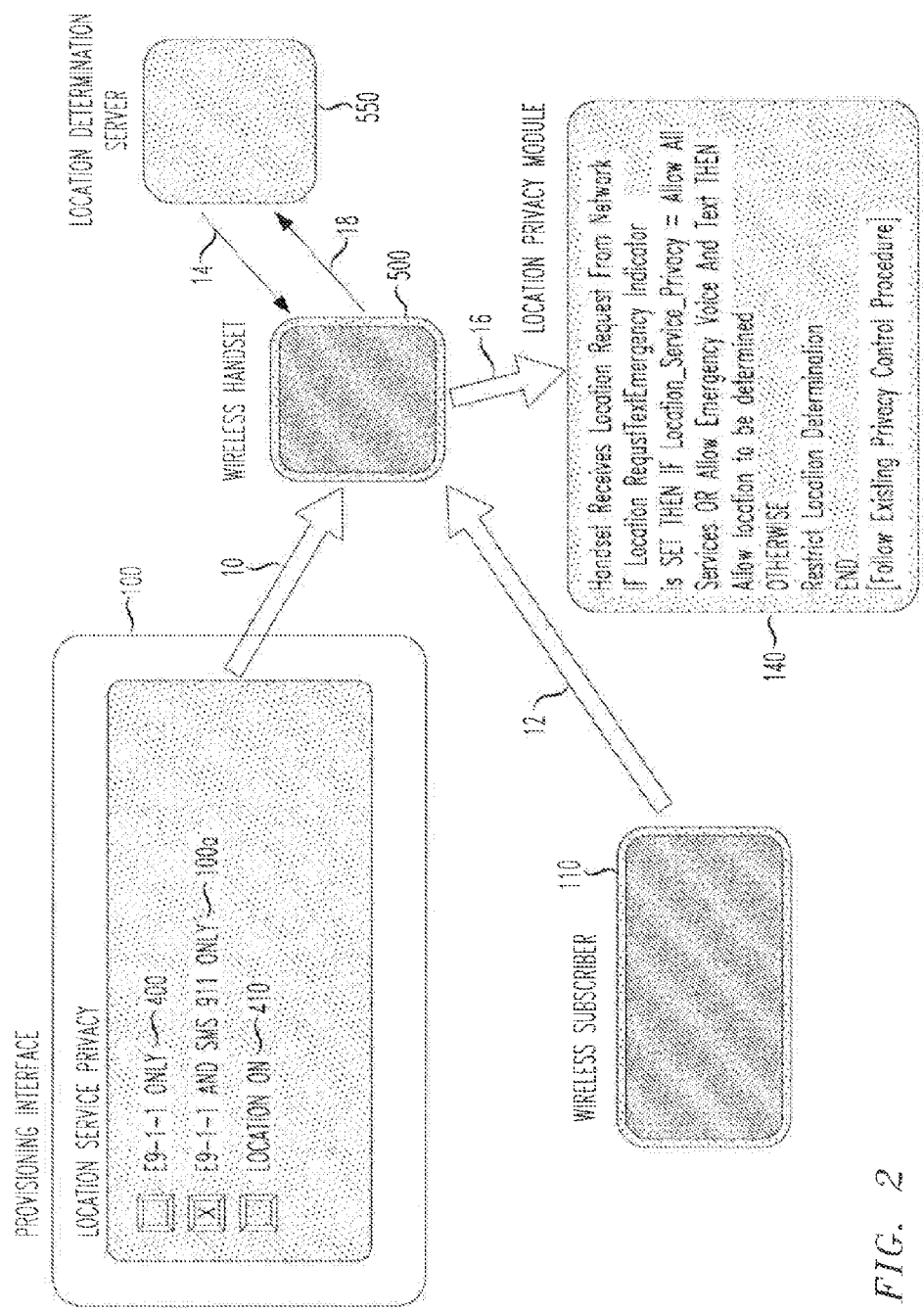
FIG. 2 depicts an exemplary wireless device providing emergency texting location privacy control, in accordance with the principles of the present invention.

FIG. 2 depicts an exemplary wireless device provided with emergency texting location privacy control, in accordance with the principles of the present invention.

As depicted in FIG. 2, a location privacy module in the wireless handset 500 provides an SMS 911 location privacy setting through a provisioning interface 100. A mobile subscriber activates an E9-1-1 and SMS 911 Only location privacy setting 100*a*, by selecting the setting 100*a* (step 10) from a compilation of location privacy settings available on a relevant wireless device.

As portrayed in FIG. 2, inventive handset software provides the following location privacy settings through a provisioning interface 100:

1. E9-1-1 Only (i.e. allow location determination for E9-1-1 voice calls only) (conventional location privacy setting) 400
2. E9-1-1 and SMS 911 Only (i.e. allow location determination for E9-1-1 voice calls and SMS 911 only) (inventive location privacy setting) 100*a*
3. Location On (i.e. allow location determination for all service types) (conventional location privacy setting) 410

As depicted in FIG. 2, a wireless subscriber 110 triggers an emergency text messaging 911 location request when they transmit an emergency text message from a wireless device 500 to an emergency text number, e.g., 911 (step 12).

The emergency text message addressed to the emergency text number, e.g., 911, is routed to the emergency text messaging 911 server 540 on the requesting device's wireless network. Receipt of an emergency text message (i.e. an SMS message addressed to an emergency text number) prompts the emergency text message 911 server 540 to request location information for the corresponding emergency text messaging device 500, by transmitting a location request and an emergency text indicator to the location determination server 550.

Receipt of an emergency text indicator, provokes the location determination server 550 to retrieve location information for the emergency text messaging device 500, without first requesting customer authorization for the location determination. Moreover, receipt of an emergency text indicator/location request combination prompts the location determination server 550 to forward an emergency text indicator and a location request to the relevant emergency text messaging device 500 to initiate location determination (step 14).

A location privacy module 140 on the relevant emergency text messaging device 500 acknowledges receipt of the emergency text indicator/location request combination. An emergency text indicator prompts the location privacy module 140 to determine whether or not location determination is permitted to proceed (step 16), depending upon the location privacy setting configured on the emergency text messaging device 500. If the location privacy setting is configured as "E9-1-1 and SMS 911 Only" or the like 100*a*, or as "Location On", the location privacy module 140 permits location information for the emergency text messaging device 500 to be disseminated to the location determination server 550 (step 18). Otherwise, location determination is restricted.

In operation, a text message that is transmitted by an emergency text messaging device 500 to an emergency text number (e.g. 911), is routed to an emergency text message 911 server 540, e.g., on the requesting device's wireless network.

When the emergency text message 911 server 540 receives the emergency text message from the emergency text messaging device 500, the emergency text message 911 server 540 facilitates the determination of the location of the emergency text messaging device 500 by initiating a location request to the location determination server 550.

In accordance with the principles of the present invention, the emergency text message 911 server 540 generates an emergency text indicator for each emergency text message that is received thereon. The emergency text message 911 server 540 then requests location information for the emergency text messaging device 500, by transmitting a location request and an emergency text indicator to the location determination server 550.

An emergency text indicator/location request combination is preferably transmitted to the location determination server 550 via an existing emergency interface (e.g. MLP ELIR). However, a location request and an emergency text indicator may alternatively be transmitted to the location determination server 550 via a non-standardized interface for location.

An emergency text indicator received together with a location request indicates to the location determination server 550 that the location request is a request for location of an emergency text messaging device to aid emergency 911 services. When the location determination server 550 receives the location request for an emergency text messaging device, indicated by way of an emergency text indicator, the location determination server 550 is instructed to perform location determination for the emergency text messaging device 500, without first acquiring consent of the user of the emergency text messaging device 500. Hence, an emergency text indicator enables the location determination server 550 to waive user consent for location determination, i.e., user consent for location determination is considered impliedly granted or not necessary when the emergency location request is received on the location determination server 550.

Once the location determination server 550 acknowledges receipt of an emergency text indicator/location request combination, the location determination server 550 forwards the emergency text indicator and a location request to the corresponding emergency text messaging device 500, to initiate location determination thereon.

The inventive location privacy module 140 acknowledges receipt of an emergency text indicator/location request combination from an emergency text messaging device 500. Receipt of the emergency text indicator/location request combination prompts the location privacy module 140 to check the location privacy setting configured on the relevant emergency text messaging device 500. If the privacy setting is configured as "E9-1-1 and SMS 911 Only" or the like 100*a*, or "Location On", on the emergency text messaging device

500, the location privacy module 140 permits location determination to proceed. Otherwise, location determination is restricted.

Results of the location request are then returned to the emergency text message 911 server 540 for subsequent routing to the appropriate Public Safety Answering Point (PSAP).

Figure 3:
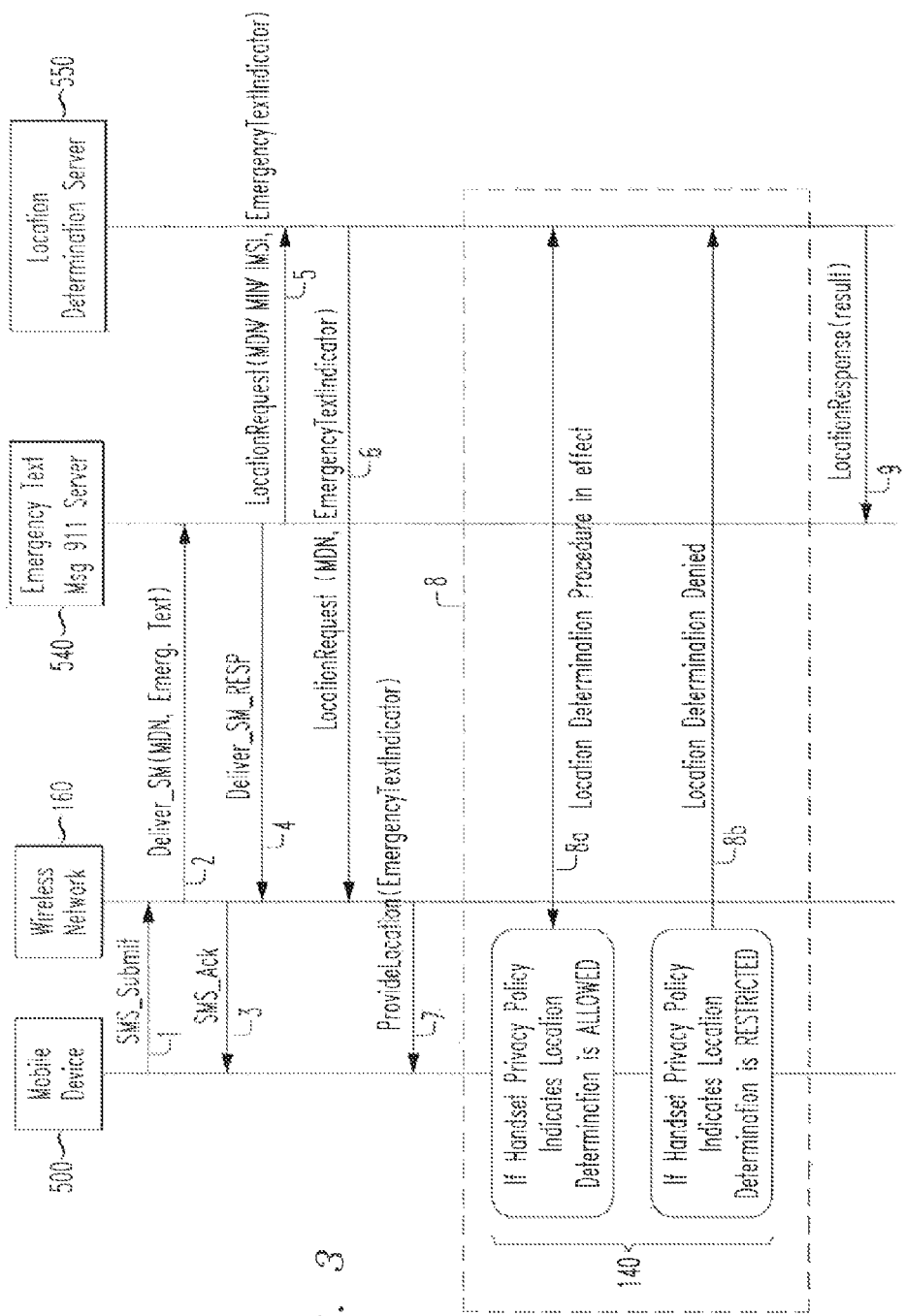
FIG. 3 shows an exemplary location determination and privacy checking call flow, in accordance with the principles of the present invention.

FIG. 3 shows an exemplary location determination and privacy checking call flow, in accordance with the principles of the present invention.

In particular, text message 911 emergency services are initiated when a mobile device 500 transmits a text message addressed in the header to an emergency text number, e.g., 911, as depicted in step 1.

In step 2, the transmitted emergency text message is received on the emergency text messaging mobile device's wireless network 160, and then is routed to an emergency text message 911 server 540, based on destination digits indicated therein.

In step 3, a node (e.g. a Short Message Service Center) on the mobile device's wireless network 160 routes a message containing delivery status for the transmitted emergency text message, back to the originating mobile device 500.

A message acknowledging the receipt of the emergency text message on the emergency text message 911 server 540 is then transmitted to a node on the originating device's wireless network 160, as depicted in step 4.

In step 5, the emergency text message 911 server 540 detects that the emergency text message received thereon is an emergency text message, and thus associates an emergency text indicator therewith. The emergency text message 911 server 540 then transmits the location request containing the emergency text indicator and a mobile directory number for the originating mobile device 500 to the location determination server 550.

In step 6, the location determination server 550 on the mobile device's 500 wireless network 160, receives the location request and detects the accompanying emergency text indicator. Upon detection, the location determination server 550 disables the requirement for user consent, and transmits a location request/emergency text indicator combination to the originating mobile device 500.

In step 7, the location request transmitted by the location determination server 550 is received on the originating device's wireless network 160 and thereby forwarded to the originating mobile device 500.

In step 8, the originating mobile device 500 receives the request for location and detects the accompanying emergency text indicator. The emergency texting wireless device 500 determines if location determination is permitted to proceed (step 8a), or if location determination must be restricted (step 8b).

As depicted in step 9, results of the location determination process are returned to the emergency text message 911 server 540 for subsequent routing to a Public Safety Answering Point (PSAP).

Figure 4:
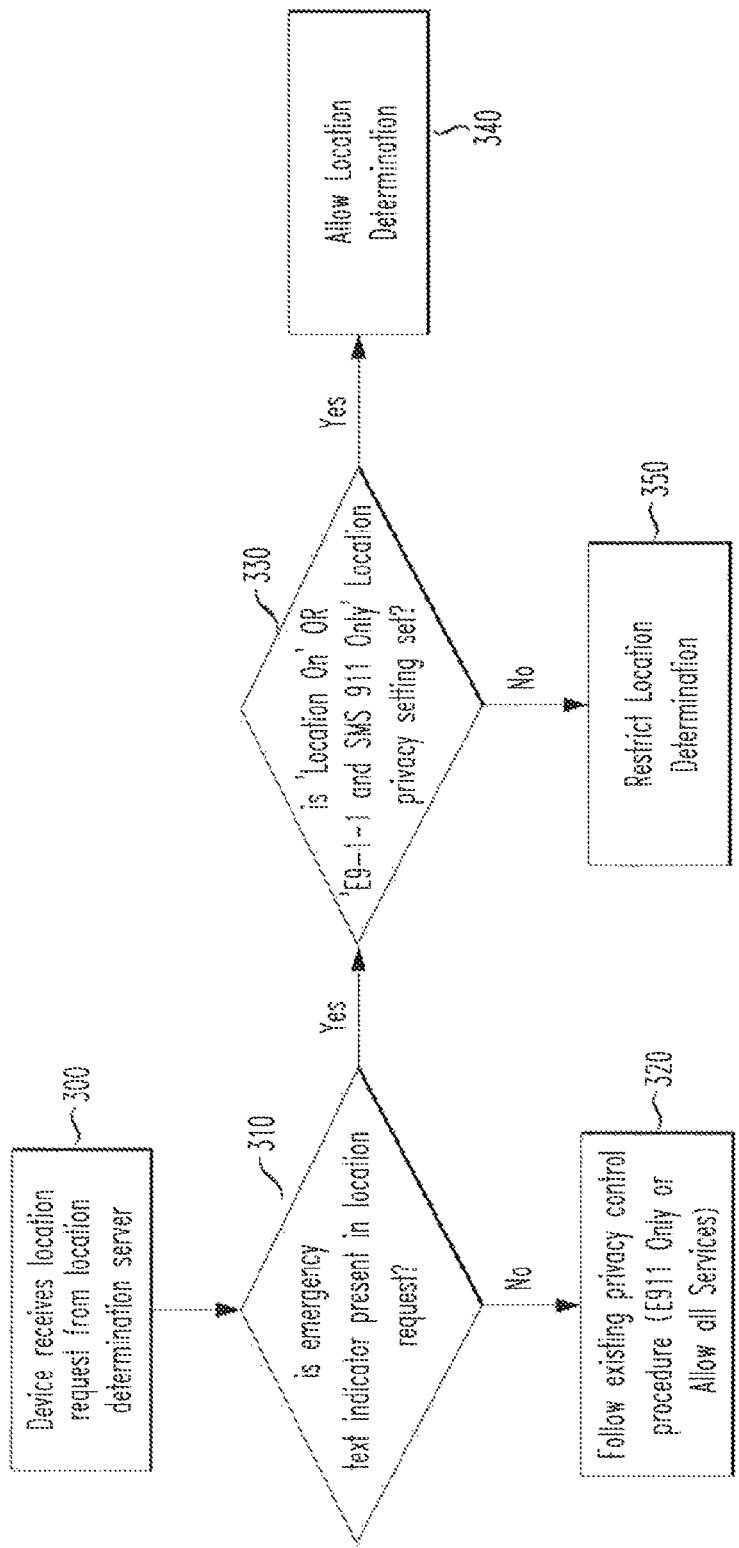
FIG. 4 depicts exemplary location privacy determination performed via the Location privacy module on an emergency text messaging device, in accordance with the principles of the present invention.
Figure 5:
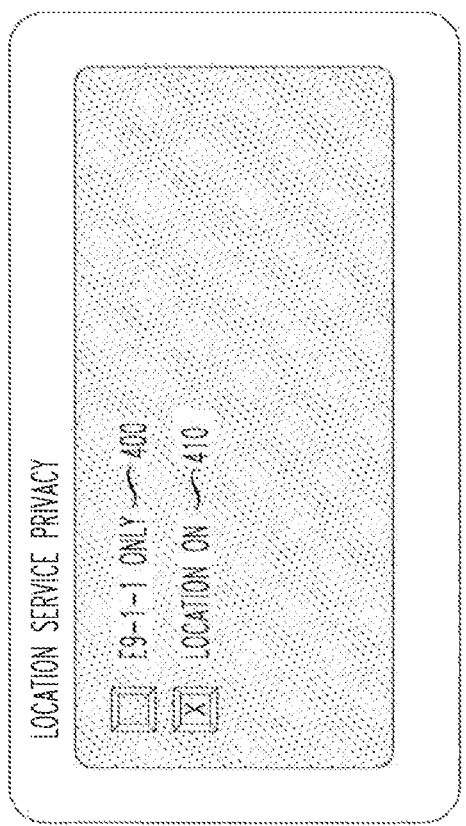
FIG. 5 demonstrates an illustrative example of location privacy settings available on a conventional wireless device.

FIG. 4 depicts exemplary location privacy determination performed via the Location privacy module on an emergency text messaging device, in accordance with the principles of the present invention.

In particular, as shown in step 300 of FIG. 4, an emergency text messaging device 500 receives a location request from a location determination server 550.

Upon receipt, a location privacy module 140 on the emergency text messaging device 500 determines if an emergency text indicator accompanies or is included within the location request, as shown in step 310.

If an emergency text indicator is not received with the location request, then privacy control procedures are performed in an otherwise conventional manner, as shown in step 320. However, if an emergency text indicator is received with the location request, the location privacy module 140 checks the location privacy setting (step 330) configured on the emergency text messaging device 500, to determine if location determination is permitted to emergency text messaging 911 services. If the location privacy is configured as "Location On", or as "E9-1-1 and emergency text message 911 Only" or the like 100a, then the location privacy module 140 permits location determination to proceed, as depicted in step 340.

If location privacy is not configured as "Location On", and not configured as "E9-1-1 and emergency text message 911 Only" or the like 100a, then location determination is restricted as depicted in step 350.

In application, the following occurs:

When the emergency text message 911 server 540 receives a request from the emergency texting device 500, the emergency text message 911 server 540 must determine the location of the emergency texting device 500 by performing a request to the location determination server 550. Prior to doing so, it performs the following:

a) Select the existing emergency interface (e.g., MLP ELIR) to be used to query the location request. The emergency text message 911 server 540 generates an emergency_text_indicator to the location determination server 550. This causes the location determination server 550 to convey the emergency_text_indicator to be sent back to the emergency texting device 500 during the location determination process and to perform location determination of the emergency texting device 500 without sending a consent request to the emergency texting device 500.

b) For non-standardized interface for location determination, an emergency_text_indicator will be set in the message from the emergency text message 911 server 540 to the location determination server 550 to indicate that the location request is in association with an emergency text message and that no consent need be sent to the emergency texting device 500 during the location determination process.

c) In either case, the emergency_text_indicator is sent back to the emergency texting device 500 to assist the emergency texting device 500 to determine whether current location information is allowed to proceed depending upon the location privacy setting in emergency texting device (e.g., wireless handset/phone) 500.

During an emergency text message origination, when the emergency text messaging device 500 receives a location request from the network to perform location determination, the location privacy module looks for an emergency_text_indicator. If the emergency_text_indicator is set and the privacy setting indicates that it allows location determination for emergency voice and text only, or if it allows location determination for all service types, the emergency texting device 500 allows location determination to proceed; otherwise, location determination is restricted.

The present invention has particular applicability to cell phone manufacturers, text message 911 server manufacturers, location/position determination server manufacturers, and/or cellular network manufacturers. Particular applications include location privacy consent, privacy category setting and detection, emergency text category, and emergency text indicator setting.

While the invention has been described with reference to the exemplary embodiments thereof, those skilled in the art will be able to make various modifications to the described embodiments of the invention without departing from the true spirit and scope of the invention.

What is claimed is:

1. A method of providing location privacy to an emergency messaging wireless device, comprising:
   receiving, at an emergency non-voice-messaging device, a location request message including an emergency indicator from a network-based server;
   determining a privacy configuration of said emergency non-voice-messaging device is set to restrict location determination by said emergency non-voice-messaging device in response to said location request message including said emergency indicator; and
   denying location information from said emergency non-voice-messaging device in response to said location request message including said emergency indicator.

2. The method of providing location privacy to an emergency text messaging wireless device according to claim 1, wherein said network-based server comprises:
   a physical location based services (LBS) server.

3. The method of providing location privacy to an emergency text messaging wireless device according to claim 1, wherein:
   location request message is associated with a non-voice emergency communication.

4. The method of providing location privacy to an emergency text messaging wireless device according to claim 3, wherein:
   said location request message originates from a source that received said non-voice emergency communication.

5. The method of providing location privacy to an emergency text messaging wireless device according to claim 4, wherein said non-voice emergency communication comprises:
   an emergency text message.

6. The method of providing location privacy to an emergency text messaging wireless device according to claim 5, wherein said emergency text message comprises:
   a short messaging system (SMS) text message.

7. The method of providing location privacy to an emergency text messaging wireless device according to claim 3, wherein:
   said network-based server identifies said location request message as being related to an established emergency session including said non-voice emergency communication.

8. The method of providing location privacy to an emergency text messaging wireless device according to claim 3, further comprising:
   transmitting an acknowledgement message acknowledging receipt of said non-voice emergency communication.

9. The method of providing location privacy to an emergency text messaging wireless device according to claim 3, wherein said non-voice emergency communication comprises:
   an emergency text message.

10. The method of providing location privacy to an emergency text messaging wireless device according to claim 9, wherein said emergency text message comprises:
    a short messaging system (SMS) text message.

11. The method of providing location privacy to an emergency text messaging wireless device according to claim 1, wherein said denying location information comprises:
    returning a restricted response to said network-based server.

12. The method of providing location privacy to an emergency text messaging wireless device according to claim 11, wherein said network-based server comprises:
    a physical location based services (LBS) server.

13. The method of providing location privacy to an emergency text messaging wireless device according to claim 11, wherein said network-based server comprises:
    an emergency text message server.

14. The method of providing location privacy to an emergency text messaging wireless device according to claim 1, wherein:
    said location information is denied from said emergency non-voice-messaging device in response to non-emergency location requests.

15. A method of providing location privacy to an emergency messaging wireless device, comprising:
    receiving a location request message including an emergency indicator within an emergency non-voice message, said emergency indicator indicating that an associated location request is in association with said emergency non-voice message, and that no consent need be sent to an emergency non-voice-messaging device that originated said emergency non-voice message during a location determination process to locate said emergency non-voice messaging device;
    determining that a location privacy setting in said emergency non-voice-messaging device indicates location determination by said emergency non-voice-messaging device is restricted in response to said location request including said emergency text indicator; and
    denying location information from said emergency non-voice-messaging device in response to said location request message including said emergency text indicator.

16. The method of providing location privacy to an emergency messaging wireless device according to claim 15, wherein said emergency non-voice message comprises:
    a short messaging system (SMS) text message.

17. The method of providing location privacy to an emergency messaging wireless device according to claim 15, wherein
    said location request message originates from a source that received said emergency non-voice message.

18. The method of providing location privacy to an emergency messaging wireless device according to claim 17, wherein said emergency non-voice message comprises:
    a short messaging system (SMS) text message.

19. The method of providing location privacy to an emergency messaging wireless device according to claim 15, further comprising:
    returning a restricted response to a network-based server.

20. The method of providing location privacy to an emergency messaging wireless device according to claim 19, wherein said network-based server comprises:
    a physical location based services (LBS) server.

21. The method of providing location privacy to an emergency messaging wireless device according to claim 15, further comprising:
    transmitting an acknowledgement message acknowledging receipt of said emergency non-voice message.

22. The method of providing location privacy to an emergency messaging wireless device according to claim 15, wherein:
    said location information is denied from said emergency non-voice-messaging device in response to non-emergency location requests.

* * * * *